United States Patent
Chidambaran et al.

(10) Patent No.: US 7,437,459 B2
(45) Date of Patent: Oct. 14, 2008

(54) CALCULATION OF SERVICE PERFORMANCE GRADES IN A MULTI-NODE ENVIRONMENT THAT HOSTS THE SERVICES

(75) Inventors: Lakshminarayanan Chidambaran, Sunnyvale, CA (US); Christopher A. Kantarjiev, Palo Alto, CA (US); James W. Stamos, Saratoga, CA (US); Peter Povinec, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 847 days.

(21) Appl. No.: 10/917,661

(22) Filed: Aug. 12, 2004

(65) Prior Publication Data

US 2005/0038800 A1 Feb. 17, 2005

Related U.S. Application Data

(60) Provisional application No. 60/500,096, filed on Sep. 3, 2003, provisional application No. 60/500,050, filed on Sep. 3, 2003, provisional application No. 60/495,368, filed on Aug. 14, 2003.

(51) Int. Cl.
*G06F 15/173* (2006.01)
*G06F 12/00* (2006.01)

(52) U.S. Cl. .................................................. 709/226
(58) Field of Classification Search ................. 709/223, 709/224, 229, 250; 708/105; 718/105
See application file for complete search history.

(56) References Cited

U.S. PATENT DOCUMENTS

| | | |
|---|---|---|
| 2,883,255 A | 4/1959 | Anderson |
| 5,774,668 A | 6/1998 | Choquier et al. |
| 5,890,167 A | 3/1999 | Bridge, Jr. et al. |

(Continued)

FOREIGN PATENT DOCUMENTS

EP 0 942 363 A2 9/1999

(Continued)

OTHER PUBLICATIONS

Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

(Continued)

*Primary Examiner*—Zarni Maung
(74) *Attorney, Agent, or Firm*—Hickerman Palermo Truong & Becker

(57) ABSTRACT

An approach generates performance grades. A performance grade is a value or set of values that indicates the relative work performance offered by a resource, such as a server in a multi-node system, relative to other resources. Performance grades are used to dynamically allocate work within a multi-node computer system. For example, performance grades are used for connection-time balancing, and to direct a database connection request to a multi-node database instance that a performance grade indicates provides better performance. Performance grade deltas are generated that reflect the incremental change in performance grade for additional sessions or work. Performance deltas are used to direct incoming sessions, to more optimally balance workload, and to deal with logon storms where a large number of connect requests arrive in a very short time period.

32 Claims, 7 Drawing Sheets

U.S. PATENT DOCUMENTS

| | | | |
|---|---|---|---|
| 5,918,059 | A | 6/1999 | Tavallaei et al. |
| 5,951,694 | A | 9/1999 | Choquier et al. |
| 6,035,379 | A | 3/2000 | Raju et al. |
| 6,041,357 | A | 3/2000 | Kunzelman et al. |
| 6,088,728 | A | 7/2000 | Bellemore et al. |
| 6,178,529 | B1 | 1/2001 | Short et al. |
| 6,243,751 | B1 | 6/2001 | Chatterjee et al. |
| 6,327,622 | B1 | 12/2001 | Jindal et al. |
| 6,556,659 | B1 | 4/2003 | Bowman-Amuah |
| 6,587,866 | B1 | 7/2003 | Modi et al. |
| 6,601,101 | B1 | 7/2003 | Lee et al. |
| 6,728,748 | B1 | 4/2004 | Mangipudi et al. |
| 6,816,907 | B1 | 11/2004 | Mei et al. |
| 7,024,394 | B1 | 4/2006 | Ashour et al. |
| 7,058,957 | B1 | 6/2006 | Nguyen |
| 7,174,379 | B2 | 2/2007 | Agarwal et al. |
| 7,178,050 | B2 | 2/2007 | Fung et al. |
| 7,263,590 | B1 | 8/2007 | Todd et al. |
| 7,269,157 | B2 | 9/2007 | Klinker et al. |
| 7,292,961 | B2 | 11/2007 | Dias et al. |
| 2001/0056493 | A1* | 12/2001 | Mineo .................. 709/227 |
| 2002/0073139 | A1 | 6/2002 | Hawkins et al. |
| 2002/0129157 | A1 | 9/2002 | Varsano |
| 2002/0161896 | A1 | 10/2002 | Wen et al. |
| 2002/0194015 | A1 | 12/2002 | Gordon et al. |
| 2003/0005028 | A1 | 1/2003 | Dritschler et al. |
| 2003/0007497 | A1 | 1/2003 | March et al. |
| 2003/0014523 | A1 | 1/2003 | Teloh et al. |
| 2003/0063122 | A1 | 4/2003 | Cichowlas et al. |
| 2003/0088671 | A1 | 5/2003 | Klinker et al. |
| 2003/0108052 | A1 | 6/2003 | Inoue et al. |
| 2003/0135642 | A1 | 7/2003 | Benedetto et al. |
| 2003/0208523 | A1 | 11/2003 | Gopalan et al. |
| 2004/0024979 | A1 | 2/2004 | Kaminsky et al. |
| 2004/0111506 | A1 | 6/2004 | Kundu et al. |
| 2004/0117794 | A1 | 6/2004 | Kundu |
| 2004/0176996 | A1 | 9/2004 | Powers et al. |
| 2004/0268357 | A1 | 12/2004 | Joy et al. |
| 2005/0021771 | A1 | 1/2005 | Kaehn et al. |
| 2005/0038800 | A1 | 2/2005 | Chidambaran et al. |
| 2005/0038833 | A1 | 2/2005 | Colrain et al. |
| 2005/0055383 | A1 | 3/2005 | Dias et al. |
| 2005/0086242 | A1 | 4/2005 | Ngai et al. |
| 2005/0086263 | A1 | 4/2005 | Ngai et al. |
| 2005/0165925 | A1 | 7/2005 | Dan et al. |
| 2005/0239476 | A1 | 10/2005 | Betrabet et al. |
| 2005/0267965 | A1 | 12/2005 | Heller |
| 2006/0036617 | A1 | 2/2006 | Bastawala et al. |
| 2006/0161816 | A1 | 7/2006 | Gula et al. |
| 2007/0226323 | A1 | 9/2007 | Halpern |

FOREIGN PATENT DOCUMENTS

| | | |
|---|---|---|
| EP | 0942363 A2 | 9/1999 |
| EP | 0 992 909 A2 | 4/2000 |
| EP | 1 170 662 A2 | 1/2002 |
| WO | WO 02/05116 A2 | 1/2002 |
| WO | WO 02/07037 A | 1/2002 |
| WO | WO 02/07037 A1 | 1/2002 |
| WO | WO 02/097676 A2 | 12/2002 |
| WO | WO 03/014928 A1 | 2/2003 |
| WO | WO 03/014928 A2 | 2/2003 |
| WO | WO 03/062983 A2 | 7/2003 |

OTHER PUBLICATIONS

Current Claims of International Application No. PCT/US2004/026570, 4 pages.
Current Claims of International Application No. PCT/US2004/025805, 8 pages.
Current Claims of International Application No. PCT/US04/26570, 4 pages.
Current Claims for International Application No. PCT/US2004/026389, pp. 1-7.
Current Claims for International Application No. PCT/US2004/026445, pp. 1-5.
Current Claims, PCT/US2004/026405, 7 pages.
Chase, Jeffrey S., "Dynamic Virtual Clusters in a Grid Site Manager," Proceedings of the IEEE International Symposium on HPDC-2003, XP010463715, pp. 90-100.
Claims, PCT/US2004/026405, 7 pages.
Claims, App. No. 04781256.3, pp. 34-36.
Ravi Kokku et al., "Half-pipe Anchoring: An Efficient Technique for Multiple Connection Handoff," Proceedings 10th International Conference on Network Protocols, Nov. 12, 2002, XP010632563, 10 pages.
Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667. (Dec. 2003).
International Searching Authority, "Notification of Transmittal of the International Search Report and the Written Opinion of the International Searching Authority, or the Declaration," Nov. 12, 2004, 13 pages.
Current Claims of International Application No. PCT/US2004/026570, 4 pages. (2004).
Current Claims of International Application No. PCT/US2004/0025805, 8 pages. (2004).
International Searching Authority, "Notification of Transmittal of the International Search Report and the Written Opinion of the International Searching Authority, or the Declaration," dated Dec. 3, 2004, 12 pages.
International Searching Authority, "Notification of Transmittal of the International Search Report and the Written Opinion of the International Searching Authority, or the Declaration, " PCT/US2004/026405, dated Jan. 6, 2006, 13 pages.
Current Claims, PCT/US2004/026405, 7 pages. (2004).
"Office Action" received in U.S. Appl. No. 11/057,043 dated Apr. 9, 2008, 19 pages.
"Office Action" received in related case U.S. Appl. No. 10/918,056, filed Aug. 12, 2004, 9 pages.
"Office Action" received in related case U.S. Appl. No. 10/917,687, filed Aug. 12, 2004, 9 pages.
European Patent Office, "Communication Pursuant to Article 96(2) EPC," App. No. 04781256.3, dated Feb. 2, 2007, 4 pages.
Claims, App. No. 04781256.3, pp. 34-36. (Feb. 10, 2006).
Kokku, Ravi et al., "Half-Pipe Anchoring: An Efficient Technique for Multiple Connection Handoff," Proceedings of the 10th International Conference of Network Protocols, Nov. 12, 2002, 10 pages.
International Preliminary Examining Authority, "Written Opinion of the International Preliminary Examining Authority," Jun. 7, 2005, 4 pages.
Current Claims of International Application No. PCT/US04/26570, 4 pages. (2004).
Current Claims for International Application No. PCT/US2004/026389, pp. 1-7. (2004).
Current Claims for International Application No. PCT/US2004/026445, pp. 1-5. (2004).
Henry Song, et al., "Browser State Repository Service," Lecture Notes in Computer Science, vol. 2414, 2002, pp. 1-14, XP002904339.
Eric Skow, et al., "A Security Architecture for Application Session Handoff," 2002, IEEE International Conference Proceedings, Apr. 28-May 2, 2002, vol. 1 of 5, pp. 2058-2063, XP010589848.
Chase, Jeffrey S., "Dynamic Virtual Clusters in a Grid Site Manager," Proceedings of the IEEE International Symposium on HPDC-2003, XP010463715, pp. 90-100 (2003).
International Searching Authority, "Notification of the Transmittal of the International Search Report and the Written Opinion of the International Searching Authority, or the Declaration", PCT/US2004/026405, dated Aug. 19, 2005, 5 pages.
Claims, PCT/US2004/026405, 7 pages. (2004).

* cited by examiner

PERFORMANCE METRICS 201 GENERATED FOR INSTANCE BY A WORK MONITOR

| | CPU UTILIZATION | NUMBER OF SESSIONS | CPU PER CALL | ELAPSED TIME PER CALL |
|---|---|---|---|---|
| SERVICE FIN | x | x | x | x |
| SERVICE PAY | x | x | x | x |
| | | | | |
| | | | | |
| | | | | |
| | | | | |

FIG. 2

PERFORMANCE METRICS 501 GENERATED FOR INSTANCE BY A WORK MONITOR

| | CPU UTILIZATION | NUMBER OF SESSIONS | CPU PER CALL | ELAPSED TIME PER CALL | CPU PER CALL PER ADDITIONAL SESSION | ELAPSED TIME PER CALL PER ADDITIONAL SESSION |
|---|---|---|---|---|---|---|
| SERVICE FIN | x | x | x | x | x | x |
| SERVICE PAY | x | x | x | x | x | x |
| | | | | | | |
| | | | | | | |
| | | | | | | |
| | | | | | | |

FIG. 5

CALCULATION OF SERVICE PERFORMANCE GRADES IN A MULTI-NODE ENVIRONMENT THAT HOSTS THE SERVICES

RELATED CASES

The present application claims priority to U.S. Provisional Application No. 60/495,368, Computer Resource Provisioning, filed on Aug. 14, 2003, which is incorporated herein by reference; the present application claims priority to U.S. Provisional Application No. 60/500,096, Service Based Workload Management and Measurement in a Distributed System, filed on Sep. 3, 2003, which is incorporated herein by reference; the present application claims priority to U.S. Provisional Application No. 60/500,050, Automatic And Dynamic Provisioning Of Databases, filed on Sep. 3, 2003, which is incorporated herein by reference.

The present application is related to the following U.S. Applications:

U.S. application Ser. No. 10/718,747, Automatic and Dynamic Provisioning of Databases filed on Nov. 21,2003, which is incorporated herein by reference;

U.S. application Ser. No. 10/917,873, Hierarchical Management of the Dynamic Allocation of Resources in a Multi-Node System, filed by Benny Souder, et al. on the equal day herewith, and incorporated herein by reference;

U.S. application Ser. No. 10/917,953, Transparent Session Migration Across Servers, filed by Sanjay Kaluskar, et al. on the equal day herewith and incorporated herein by reference;

U.S. application Ser. No. 10/918,055, Incremental Run-Time Session Balancing in a Multi-Node System filed by Lakshminarayanan Chidambaran, et al. on the equal day herewith and incorporated herein by reference;

U.S. application Ser. No. 10/918,056, Service Placement for Enforcing Performance and Availability Levels in a Multi-Node System, filed by Lakshminarayanan Chidambaran, et al. on the equal day herewith and incorporated herein by reference;

U.S. application Ser. No. 10/917,687, On Demand Node and Server Instance Allocation and De-Allocation, filed by Lakshminarayanan Chidambaran, et al. on the equal day herewith and incorporated herein by reference;

U.S. application Ser. No. 10/918,054, Recoverable Asynchronous Message Driven Processing in a Multi-Node System, filed by Lakshminarayanan Chidambaran, et al. on the equal day herewith and incorporated herein by reference; and U.S. application Ser. No. 10/917,715, Managing Workload by Service, filed by Carol Colrain, et al. on the equal day herewith and incorporated herein by reference.

FIELD OF THE INVENTION

The present invention relates to work load management, and in particular, work load management within a multi-node computer system.

BACKGROUND OF THE INVENTION

Enterprises are looking at ways of reducing costs and increasing efficiencies of their data processing system. A typical enterprise data processing system allocates individual resources for each of the enterprise's applications. Enough resources are acquired for each application to handle the estimated peak load of the application. Each application has different load characteristics; some applications are busy during the day; some others during the night; some reports are run once a week and some others once a month. As a result, there is a lot of resource capacity that is left unutilized. Grid computing enables the utilization or elimination of this unutilized capacity. In fact, grid computing is poised to drastically change the economics of computing.

A grid is a collection of computing elements that provide processing and some degree of shared storage; the resources of a grid are allocated dynamically to meet the computational needs and priorities of its clients. Grid computing can dramatically lower the cost of computing, extend the availability of computing resources, and deliver higher productivity and higher quality. The basic idea of grid computing is the notion of computing as a utility, analogous to the electric power grid or the telephone network. A client of the grid does not care where its data is or where the computation is performed. All a client wants is to have computation done and have the information delivered to the client when it wants.

This is analogous to the way electric utilities work; a customer does not know where the generator is, or how the electric grid is wired. The customer just asks for electricity and gets it. The goal is to make computing a utility—a ubiquitous commodity. Hence it has the name, the grid.

This view of grid computing as a utility is, of course, a client side view. From the server side, or behind the scenes, the grid is about resource allocation, information sharing, and high availability. Resource allocation ensures that all those that need or request resources are getting what they need. Resources are not standing idle while requests are left unserviced. Information sharing makes sure that the information clients and applications need is available where and when it is needed. High availability ensures that all the data and computation must always be there—just as a utility company must always provide electric power.

Grid Computing for Databases

One area of computer technology that can benefit from grid computing is database technology. A grid can support multiple databases and dynamically allocate and reallocate resources as needed to support the current demand for each database. As the demand for a database increases, more resources are allocated for that database, while other resources are deallocated from another database. For example, on an enterprise grid, a database is being serviced by one database server running on one server blade on the grid. The number of users requesting data from the database increases. In response to this increase in the demand for the database, a database server for another database is removed from one server blade and a database server for the database experiencing increased user requests is provisioned to the server blade.

Grid computing for databases can require allocation and management of resources at different levels. At a level corresponding to a single database, the performance and resource availability provided to the users of the database must be monitored and resources of the database allocated between the users to ensure performance and resource availability goals for each of the users are met. Between databases, the allocation of a grid's resources must be managed to ensure that performance and resource availability goals for users of all the databases are met.

A mechanism that can allocate resources at these different levels is described in Hierarchical Management of the Dynamic Allocation of Resources in a Multi-Node System Ser. No. 10/917,873. One measure employed by this mechanism to manage allocation of resources used for a database is referred to as session balancing. Session balancing is used to balance workload between the servers of a multi-node server that manages access to a particular database. Each database server that comprises the multi-node server is referred to herein as a database instance. Session balancing entails balancing a number of sessions between database instances to optimize performance realized by a user and ensures requirements for performance are being met.

Two forms of session balancing that may be used are connection-time session balancing and run-time session balancing. Under run-time session balancing, sessions on one database instance, where workload may be too high, are moved to a target database instance that offers relatively superior performance. Under connection-time balancing, a user requesting a connection to a multi-node database server is connected to a database instance that provides better performance for the user.

In both types of session balancing, a database instance is selected based on whether the database instance can provide relatively superior performance for a user. Therefore, there is a need to measure and determine which server from a set of servers can provide relatively superior performance for a user.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram showing performance metrics generated according to an embodiment of the present invention.

FIG. 5 is a block diagram showing performance metrics generated according to an embodiment of the present invention.

DETAILED DESCRIPTION OF THE INVENTION

A method and apparatus for managing the allocation of resources in a multi-node environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches for generating "performance grades." A performance grade is a value or set of values that indicate the relative work performance offered by a resource, such as a server in a multi-node computer system, relative to other resources. Performance grades are used to dynamically allocate work within a multi-node computer system. For example, performance grades are used for connection-time balancing, to direct a database connection request to a multi-node database instance that a performance grade indicates provides better performance.

Figure 1:
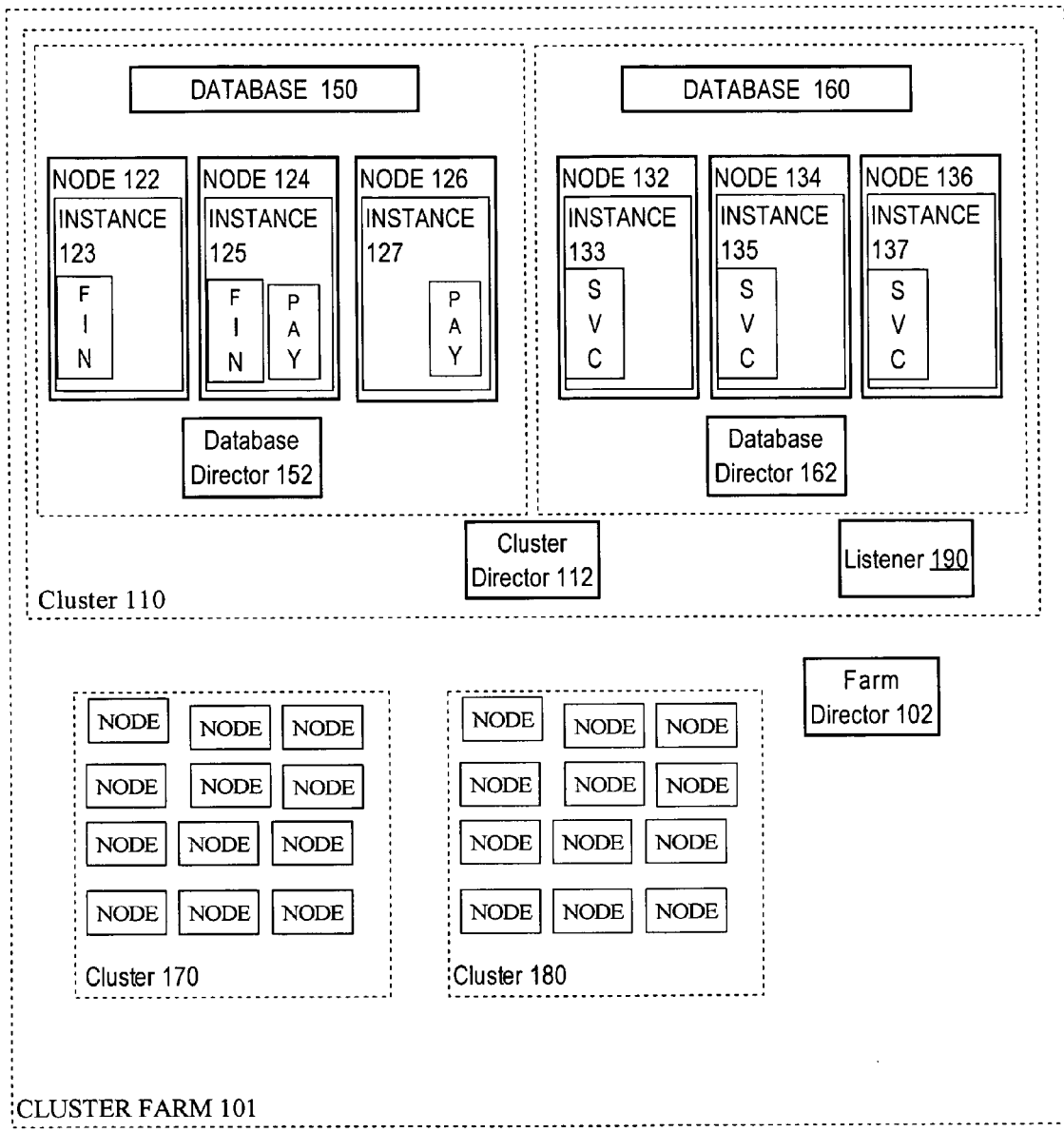
FIG. 1 is a block diagram showing a multi-node computer system on which an embodiment of the present invention may be implemented.

FIG. 1 shows a multi-node computer system that may be used to implement an embodiment of the present invention. Referring to FIG. 1, it shows cluster farm 101. A cluster farm is a set of nodes that is organized into groups of nodes, referred to as clusters. Clusters provide some degree of shared storage (e.g. shared access to a set of disk drives) between the nodes in the cluster. Cluster farm 101 includes clusters 110, 170, and 180. Each of the clusters hosts one or more multi-node database servers that provide and manage access to databases. The nodes in a cluster farm may be in the form of computers (e.g. work stations, personal computers) interconnected via a network, and may be part of a grid.

Clusters and Multi-Node Database Servers

Clusters 110, 170, and 180 host one or more multi-node database servers. Cluster 110 hosts a multi-node database server for database 150, the multi-node database server comprising database instances 123, 125, and 127, which are hosted on nodes 122, 124, and 126, respectively. Cluster 110 also hosts a multi-node database server for database 160, the multi-node database server comprising database instances 133, 135, and 137 hosted on nodes 132, 134, and 136, respectively.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node computer system can be allocated to running a particular server's software. Each combination of the software and allocation of the resources from a node is a server that is referred to herein as a "server instance" or "instance". Thus, a multi-node server comprises multiple server instances that can run on multiple nodes. Several instances of a multi-node server can even run on the same node. A multi-node database server comprises multiple "database instances", each database instance running on a node, and governing and facilitating access to a particular database. Database instances 123, 125, and 127 are instances of the same multi-node database server.

A service is work of a particular type or category that is hosted for the benefit of one or more clients. The work performed as part of a service includes any use or expenditure of computer resources, including, for example, CPU processing time, storing and accessing data in volatile memory, read and writes from and to persistent storage (i.e. disk space), and use of network or bus bandwidth.

One type of service is a database service. Cluster 110 provides a database service for accessing database 150 and a database service for accessing database 160. In general, a database service is work that is performed by a database server for a client, work that typically includes processing queries that require access to a particular database.

Like any service, a database service may be further categorized. Database services for database 150 are further categorized into the FIN service and PAY service. The FIN service is the database service performed by database instances 123 and 125 for the FIN application. Typically, this service involves accessing database objects on database 150 that store database data for FIN applications. The PAY services are database services performed by database instances 125 and 127 for the PAY application. Typically, this service involves accessing database objects on database 150 that store database data for PAY applications.

Sessions Established for Clients by Listener

In order for a client to interact with a database server on cluster 110, a session is established for the client. A session, such as a database session, is a particular connection established for a client to a server, such as a database instance, through which the client issues a series of requests (requests for execution of database statements). For each database session established on a database instance, session state data is maintained that reflects the current state of a database session. Such information contains, for example, the identity of the client for which the session is established, and temporary variable values generated by processes executing software within the database session.

A client establishes a database session by transmitting a database connection request to cluster 110. A listener, such as listener 190, receives the database connection request. Listener 190 is a process running on cluster 110 that receives client database connection requests and directs them to a database instance within cluster 110. The client connection requests received are associated with a service (e.g. service FIN and PAY). The client request is directed to a database instance hosting the service, where a database session is established for the client. Listener 190 directs the request to the particular database instance and/or node in a way that is transparent to the application.

Listener 190 performs connection-time balancing. When listener 190 receives a connection request for a user associated with a particular service, listener 190 directs the connection request to a database instance that offers relatively superior performance for the service.

Listener 190 may be running on any node within cluster 110. Once the database session is established for the client, the client may issue additional requests, which may be in the form of function or remote procedure invocations, and which include requests to begin execution of a transaction, to execute queries, to perform updates and other types of transaction operations, to commit or otherwise terminate a transaction, and to terminate a database session.

Monitoring Workload

Resources are allocated and re-allocated to meet levels of performance and cardinality constraints on the resources. Levels of performance and resource availability established for a particular service are referred to herein as service-level agreements. Levels of performance and cardinality constraints on resources that apply to a multi-node system in general and not necessarily to a particular service are referred to herein as policies. For example, a service-level agreement for service FIN maybe require as a level of performance that the average transaction time for service FIN be no more than a given threshold, and as an availability requirement that at least two instances host service FIN. A policy may require that the CPU utilization of any node should not exceed 80%.

Policies may also be referred to herein as backend policies because they are used by backend administrators to manage overall system performance and to allocate resources between a set of services when it is deemed there are insufficient resources to meet service-level agreements of all the set of services. For example, a policy assigns a higher priority to a database relative to another database. When there are insufficient resources to meet service-level agreements of services of both databases, the database with the higher priority, and the services that use the database, will be favored when allocating resources.

To meet service-level agreements, a mechanism is needed to monitor and measure workload placed on various resources. These measures of workload are used to determine whether service-level agreements are being met and to adjust the allocation of resources as needed to meet the service-level agreements.

According to an embodiment of the present invention, a workload monitor is hosted on each database instance and generates "performance metrics". Performance metrics is data that indicates the level of performance for one or more resources or services based on performance measures. Approaches for performing these functions are described in Managing Workload by Service Ser. No. 10/917,715. The information generated is accessible by various components within multi-node database server 222 that are responsible for managing the allocation of resources to meet service-level agreements, as shall be described in greater detail later.

A performance metric of a particular type that can be used to gauge a characteristic or condition that indicates a level of performance or workload is referred to herein as a performance measure. A performance measure includes for example, transaction execution time or percent of CPU utilization. In general, service-level agreements that involve levels of performance can be defined by thresholds and criteria that are based on performance measures.

For example, execution time of a transaction is a performance measure. A service-level agreement based on this measure is that a transaction for service FIN should execute within 300 milliseconds. Yet another performance measure is percentage CPU utilization of a node. A backend policy based on this measure is that a node experience no more than 80% utilization.

Performance metrics can indicate the performance of a cluster, the performance of a service running on a cluster, a node in the cluster, or a particular database instance. A performance metric or measure particular to a service is referred to herein as a service performance metric or measure. For example, a service performance measure for service FIN is the transaction time for transactions executed for service FIN.

FIG. 2 is a diagram that shows performance metrics generated by a workload monitor running on database instance 125 according to an embodiment of the present invention. Referring to FIG. 2, performance metrics table 201 reflects the performance realized by services hosted by database instance 125. Performance metrics table 201 contains columns with values that serve as a performance metric for a particular service hosted by database instance 125. Rows 202 and 203 contain performance metrics for service FIN and PAY, respectively. The table includes the columns CPU UTILIZATION, NUMBER OF SESSIONS, CPU PER CALL, and ELAPSED TIME PER CALL. CPU UTILIZATION contains values that specify a percentage of CPU utilization on node 124 used by a service. NUMBER OF SESSIONS contains values that specify a number of database sessions allocated for a service.

The columns CPU PER CALL, and ELAPSED TIME PER CALL are based on work performed to process a call. A call is a request from a client to perform a task, such as executing a database statement. A call can be commenced by invoking an API function of a database server. An example of such an API is the Oracle Call Interface ("OCI"). A client can call the function of the API directly, or via interface components used by a client to interface with a database server. Such interface components include, for example, Oracle Business Components for Java, as described in *Oracle Business Components for Java, An Oracle White Paper*, by Oracle Corporation.

CPU PER CALL contains values that specify an average percent CPU utilization used by a database instance to process a call made by a user associated with a service. ELAPSED TIME PER CALL contains values that specify an average period of time that elapses to process a call made by a user associated with a service.

Hierarchy Of Directors

A hierarchy of directors, such as that described in Hierarchical Management of the Dynamic Allocation of Resources in a Multi-Node System Ser. No. 10/917,873, is used to dynamically adjust the allocation of resources within cluster farm 101 to meet service-level agreements. Cluster farm 101 includes a database director for each database managed by a database server on cluster farm 101, a cluster director for each cluster within cluster farm 101, and a farm director for cluster farm 101.

A database director, such as database director 152 and 162, dynamically manages and adjusts the allocation of resources of a database between services hosted by the database instances of the database. One measure a database director uses to perform this responsibility is to perform incremental runtime session balancing between the database instances of a database as described in Incremental Run-Time Session Balancing in a Multi-Node System Ser. No. 10/918,055. Incremental runtime session balancing migrates the database sessions of a service between database instances hosting the service. Such session migration is described in Transparent Session Migration Across Servers Ser. No. 10/917,953.

A cluster director, such as cluster director 112, manages and adjusts allocation of resources between databases. One measure a cluster director undertakes to perform this responsibility is to add or remove a database instance for a database to or from an existing node within a cluster.

A farm director, such as farm director 102, manages and adjusts allocation of resources between clusters. One measure a farm director undertakes to perform this responsibility is to add or remove a node to or from a cluster.

The directors detect violations of service-level agreements, herein referred to as performance violations. For example, database director 152 periodically analyzes performance metrics and determines that the average transaction time for FIN on instance 125 violates the service-level agreement for this measure or determines that the percent CPU utilization on node 124 for service FIN violates the service-level agreement for CPU utilization. Cluster director 112 may determine that the CPU utilization for node 124 violates the policy for CPU utilization.

Performance Grades and Deltas

As mentioned before, listener 190 performs connection-time balancing, directing connection requests associated with a service to a database instance offering superior performance for that service. When directing requests in this way, listener 190 selects a database instance to which to direct a connection request based on a performance grade.

According to an embodiment, performance grades are generated by the workload monitor for services hosted by the database instances of a database. An example of how a performance grade can be calculated shall be later described. To provide listener 190 with performance grades, the workload monitor publishes the performance grades to the listener. Listener 190 uses them to perform connection-time balancing, directing connection requests to the database with better performance grades.

In providing performance grades, overhead is incurred in the form of inter-process and inter-node communication to retrieve performance metrics and transmit performance grades and in the form of processing to calculate the performance grades. To reduce this overhead, the workload monitor periodically calculates performance grades and transmits them to listener 190.

Between transmissions of performance grades to listener 190, listener 190 may direct connection requests to database instances based on the most recently transmitted performance grades. Over a period of time, during which connection requests are directed to a particular database instance, the actual superiority of performance provided by the database instance decreases. Eventually, the copy of a performance grade stored by listener 190, left unchanged, may indicate that a database instance offers superior performance when in fact it provides inferior performance. Thus, as performance grades age (or a copy thereof), the performance grade may inaccurately reflect actual superiority of performance.

To compensate for the potential inaccuracy of aging performance grades, listener 190 adjusts the performance grades by applying a performance delta to copies of performance grades it stores. A performance delta is a value that indicates the difference in a performance grade caused by allocating more or less work to a computer resource, such as a database server. Performance deltas applied by listener 190 to the performance grades may indicate the decrease in a performance grade caused by establishing another session on a database instance. On the other hand, performance grades may indicate the improvement in a performance grade caused by, for example, clients disconnecting and their sessions terminating or migrating sessions to another server. Performance grades updated by performance deltas serve as an estimate of superiority of performance on a database instance after directing a number of database connection requests to the database instance.

Figure 3:
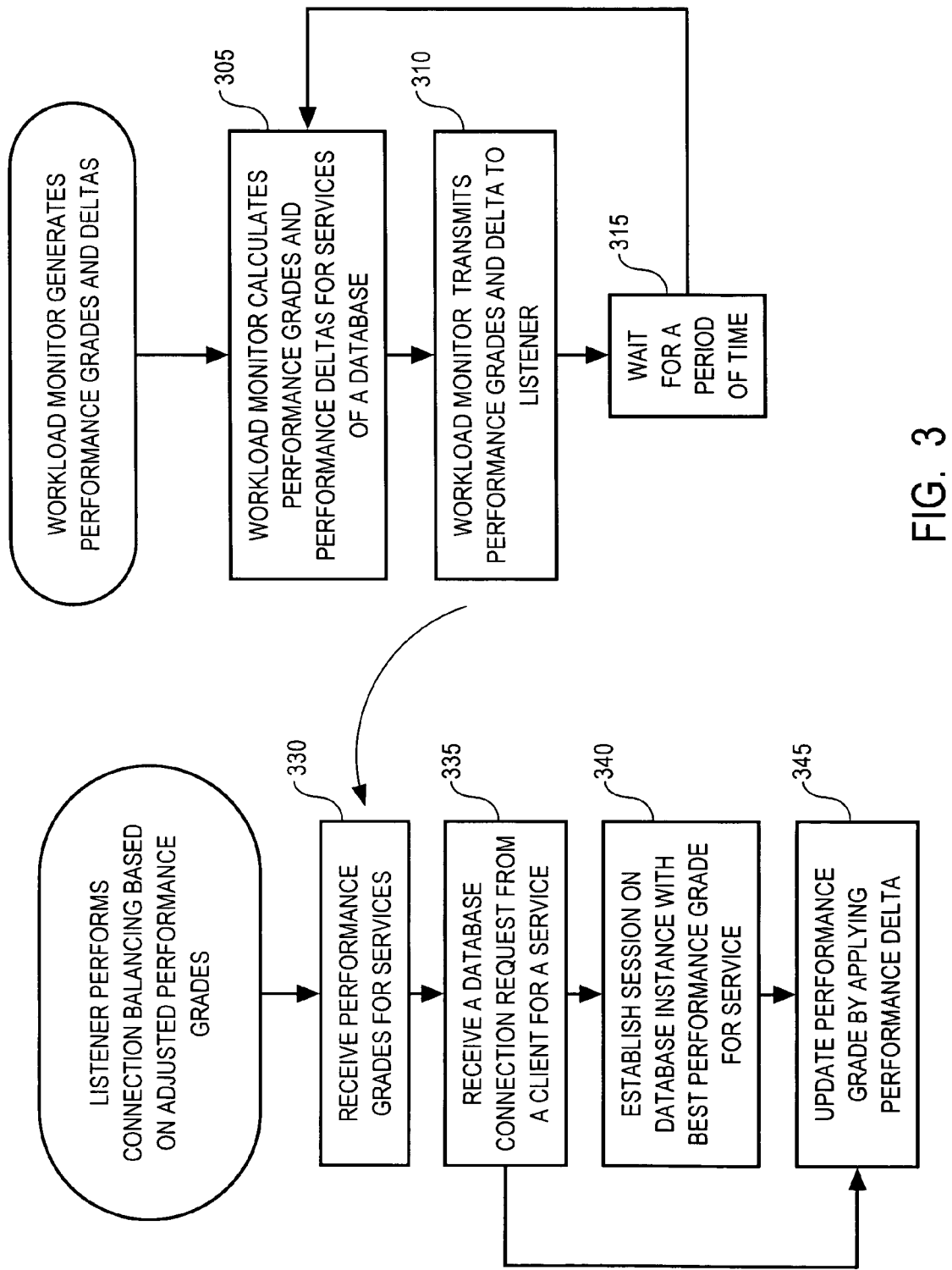
FIG. 3 is a flow chart showing a procedure for generating performance grades and performance deltas according to an embodiment of the present invention.

FIG. 3 shows a flow chart showing how performance grades are generated and are used to perform connection-time balancing. The steps of the flow chart are illustrated using listener 190 and database director 152, which manages allocation of resources for database 150. Steps 305-315 are performed as a loop by database director 152 and steps 330-345 are performed by listener 190.

At step 305, the workload monitor calculates performance grades and performance deltas for services PAY and FIN. Examples of how performance grades and deltas can be calculated are described later in greater detail.

At step 310, the workload monitor transmits the performance grades and deltas to listener 190.

At step 315, the workload monitor waits for a period of time. A shorter period of time results in performances grades and deltas being generated more frequently, increasing overhead of providing performance grades. However, the accuracy of the copies of the performance grades stored by the listener increases because the listener is provided with more up-to-date performance grades. More accurate performance grades enable listener 190 to more accurately balance workload between database instances. A longer period of time decreases the overhead in providing performance grades and also decreases the accuracy of performance grade copies stored by listener 190. Inaccurate performance grades cause less accurate connection-time balancing, shifting work to database instances with greater work-load, and increasing the incidence of service-level violations and overhead incurred to remedy the violations. The waiting period for step 315 may be adjusted to optimize the overhead and inefficiencies attendant to shorter periods of time and longer periods of time. After waiting a period of time, performance grades and deltas are re-calculated again at step 305.

Listener Uses and Adjusts Performance Grades

At step 330, listener 190 receives performance grades that are transmitted periodically by database director 152. For purposes of illustration, the following performance grades and deltas are received:

TABLE A

Performance Grades and Deltas

| Server | Service | Performance Grade | Performance Delta |
|---|---|---|---|
| 123 | FIN | 50 | 5 |
| 125 | FIN | 30 | 9 |
| 125 | PAY | 35 | 8 |
| 127 | PAY | 60 | 6 |

Performance grades depicted in Table A are higher when a database instance offers relatively superior performance. For example, for database instance 123, the performance grade for service FIN is 50, indicating database instance 123 offers superior performance for service FIN than does database instance 125, whose performance grade for service FIN is 30. The performance delta for service FIN on database instance 123 is 5, indicating that establishing another session on database instance 123 for service FIN degrades the performance grade by 5.

After receiving the performance grades and deltas, listener 190 stores a copy of the performance grades and deltas, replacing any previously stored copy of performance grades.

At step 335, listener 190 receives a connection request from a client associated with service FIN. At step 340, listener 190 establishes a database session on the database instance that the stored copy of performance grades indicates offers superior performance. For service FIN, the performance grade is 50 and 30, respectively, indicating that database instance 123 offers superior performance. Listener 190 establishes a database session on database instance 123 by directing the connection request there.

At step 345, listener 190 updates the stored performance grades by applying the respective performance delta to the performance grade corresponding to the database instance and service for which a connection was established at step 335. Thus, listener 190 reduces the performance grade for service FIN and database instance 123 by a delta of 5, from 50 to 45.

Subsequently, at step 335, listener 190 receives a connection request from a client associated with service FIN, without having received a new version of performance grades from database director 152. At step 340, listener 190 again establishes a database session on the database instance that the stored performance grades indicate offers superior performance. For service FIN, the performance grades of the available database instances are 45 and 30. Accordingly, listener 190 establishes a database session on database instance 123.

Illustrative Performance Grade Function

Figure 4:
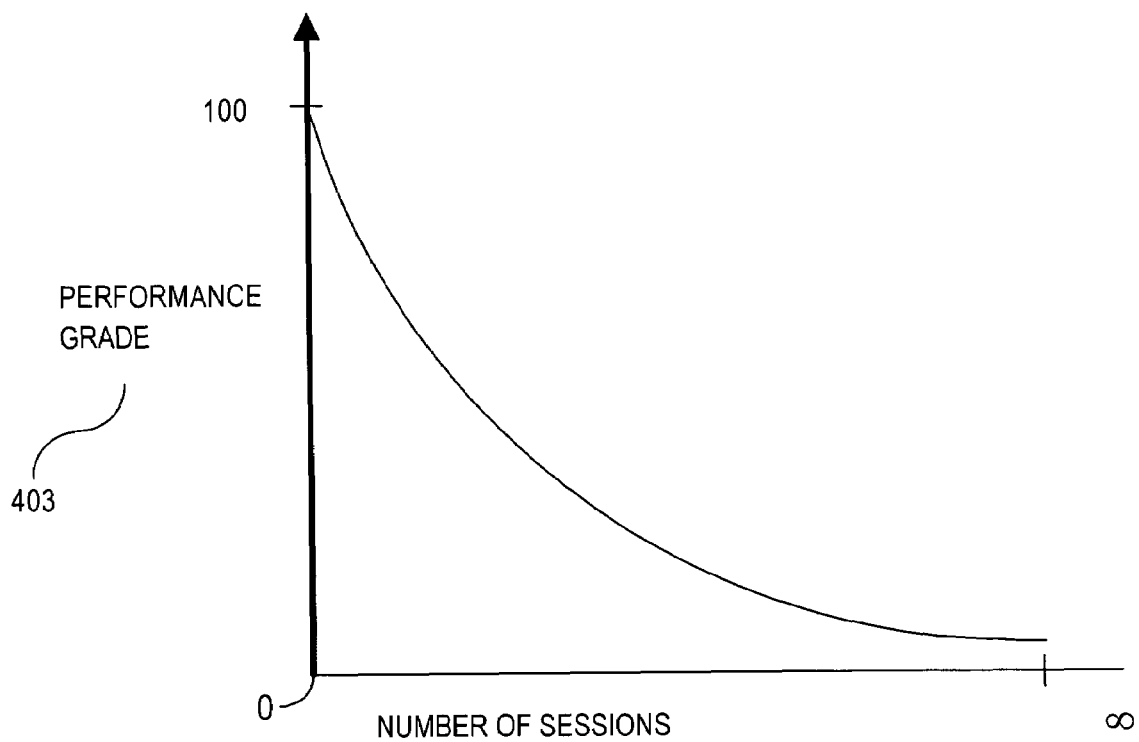
FIG. 4 is a diagram illustrating a mathematical function used to calculate performance grades and performance deltas according to an embodiment of the present invention.

FIG. 4 is a diagram illustrating a mathematical function used to calculate performance grades and deltas. According to an embodiment of the present invention, performance grades are the value of a mathematical function CE, the equation for which is c/e, where c is average CPU utilization per call and e is elapsed time for call. Function CE can be calculated for all services, or for a particular service. For example, the performance grades for service FIN in table A were based on the following performance metrics in table B, which were generated at a time t.

TABLE B

Performance Metrics for Time t

| DATABASE INSTANCE | SERVICE | CPU PER CALL | ELAPSED TIME PER CALL |
|---|---|---|---|
| 123 | FIN | 5.0% | .10 sec |
| 125 | FIN | 4.5% | .15 sec |

The performance grade for service FIN on database instance 123 is calculated as 5.0%/0.10, which is equal to 50. The performance grade for service FIN on database instance 123 is calculated as 4.5%/0.15, which is equal to 30.

A performance grade based on function CE represents the rate at which an additional session is "given" CPU processing time. Chart 403 shows the expected behavior of function CE. As the number of sessions increases, more calls occur, the CPU utilization per call decreases while the elapsed time to process a call increases, and performance decreases and worsens. As the number of sessions decrease, less calls occur, the CPU utilization per call increases while the elapsed time to process a call decreases, and performance improves.

Performance Delta

The performance delta for the performance grade based on function CE is the derivative of function CE, which is:

$$\frac{1}{e}\frac{dc}{ds} - \frac{c}{e^2}\frac{de}{ds}$$

The derivative dc/ds represents the slope or rate of change of average CPU utilization per call for an additional session. The derivative de/ds represents the slope or rate of change of average elapsed time per call for an additional session.

These derivative values may be estimated based on statistical sampling of the performance metrics and tracked as part of performance metrics generated by a work load monitor. For example, when the number of sessions for service on a database instance is 20, statistical sampling shows that when 1 session is added e increases by 0.02 seconds, indicating that de/ds is 0.02 when number of sessions is 20. On the other hand, c decreases by 3%, indicating that dc/ds is −3% when the number of sessions is 20.

The calculation of dc/ds and de/ds does not have to based on measuring the change caused by adding just a single session, but can be based on measuring a change caused by adding multiple sessions and assuming the dc/ds and de/ds are constant. For example, when the number of sessions is 20, statistical sampling shows that when 5 sessions are added e increases by 0.1 seconds, indicating that de/ds is 0.02 when the number of sessions is between 20 and 24. On the other hand, c decreases by 15%, indicating that dc/ds is −3% when the number session is between 20 and 24.

Higher order derivative may be used. For example, a second level derivative may be used in addition to a first level derivative to calculate performance deltas.

FIG. 5 shows performance metrics generated by a workload monitor running on database instance 125 that generates information that indicate the values dc/ds and de/ds for each service hosted by database instance 125, according to an embodiment of the present invention. These values may be calculated as described above. Similar to performance metrics table 201, performance metrics table 501 reflects the performance realized by services hosted by database instance 125. The table includes columns CPU UTILIZATION, NUMBER OF SESSIONS, CPU PER CALL, and ELAPSED TIME PER CALL. In addition, table 501 includes CPU PER CALL PER ADDITIONAL SESSION and ELAPSED TIME PER CALL PER ADDITIONAL SESSION. CPU PER CALL PER ADDITIONAL SESSION contains values that indicate the rate of change of average percent CPU utilization per call for an additional session. ELAPSED TIME PER CALL PER ADDITIONAL SESSION indicates the rate of change of elapsed time per call for an additional session.

Performance grades can be used in many contexts where there is need to make a determination of what server is providing relatively superior performance for a particular type of work. For example, during incremental run-time session balancing, as described in Incremental Run-Time Session Balancing in a Multi-Node System Ser. No. 10/918,055, a determination is made about which database instance of a set of candidate database instances should be a destination to which to migrate database sessions. The determination can be based, at least in part, on the performance grade of candidates.

Performance deltas can also be calculated when a performance grade is revised. For a particular performance grade, the delta is the quotient of the difference between the revised performance grade and its previous value divided by the difference of the new number of sessions and the previous value of the number sessions for the service. Specifically, the delta is calculated according to the following formula PD.

(new_grade−old_grade)/(new_session_count−old_session_count)

New_grade is the performance grade, as revised, for a service hosted on an instance; new_session_count is the number of sessions for the service on the instance when the performance grade was revised. Old_grade is the previous performance grade value before the revision, for the service hosted on the instance; old_session_count is the previous number of sessions before the revision. Calculating performance grade deltas in this way requires keeping track of the new_grade, old_grade, new_session_count and old_session_count on a per service basis.

Figure 6:
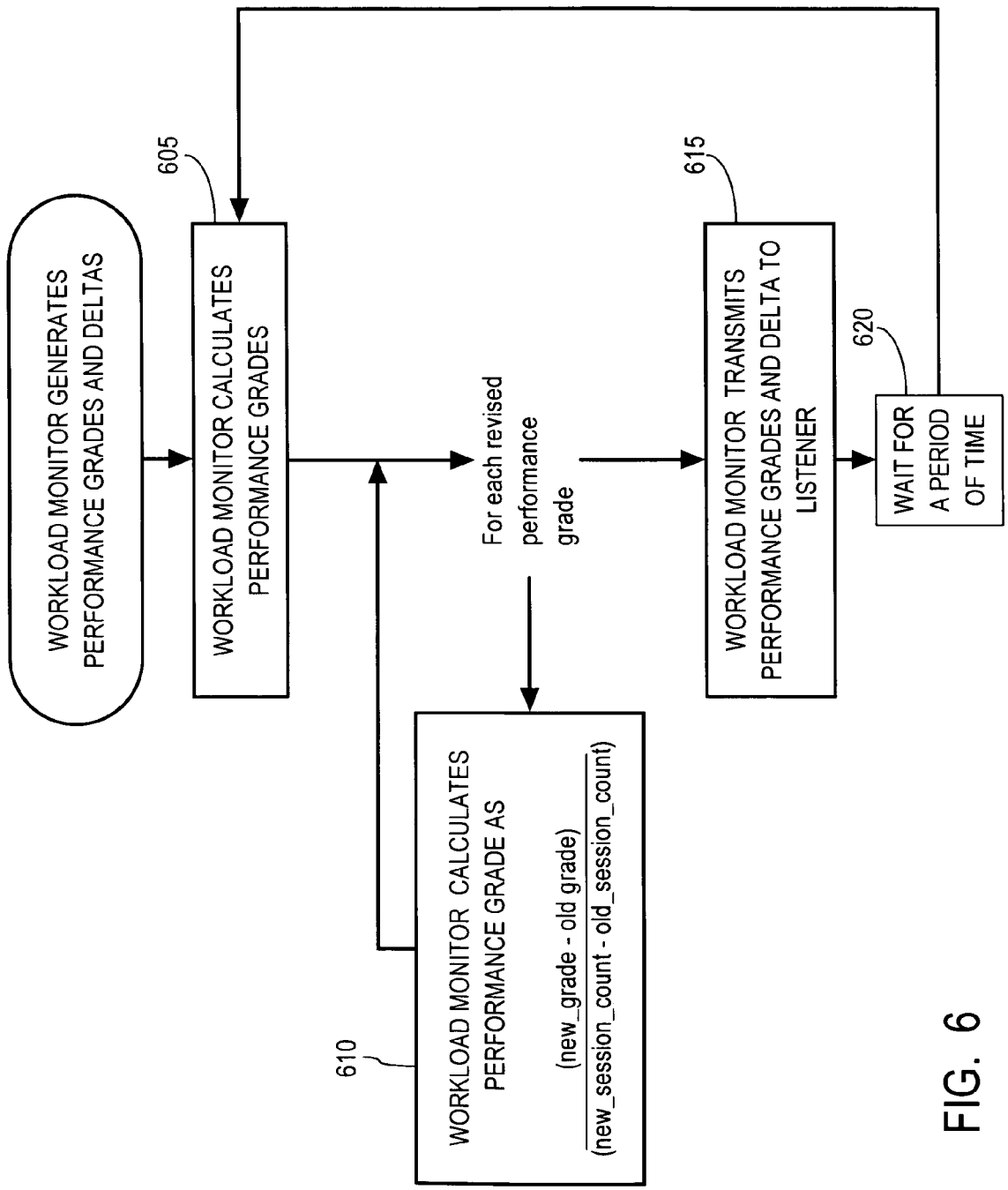
FIG. 6 is a flow chart showing a procedure for generating performance grades and performance deltas according to an embodiment of the present invention.

FIG. 6 shows a procedure for generating performance grade deltas according to formula PD. At step 605, the workload monitor recalculates performance grades for services PAY and FIN.

For each performance grade whose value has changed, as step 610, the workload monitor calculates the performance delta according to formula PD. Next step 615, the workload monitor transmits the performance grades and deltas to listener 190.

At step 620, the workload monitor waits for a period of time, then resumes recalculating the performance grades and deltas beginning with step 605.

Transmitting Other Information Relevant to Performance and Availability

Other information relevant to connection-time balancing and other responsibilities of the listener 190 may be periodically transmitted to it by a database director. Such other information includes whether a particular service is experiencing a service violation or that connection requests are no longer to be directed to a particular database server.

According to an embodiment of the present invention, a database director periodically sends a four element tuple of data about each service hosted on a particular database instance. The first element in the tuple includes the performance grade and delta. The second element in the tuple is a flag indicating whether a performance violation is being encountered for the service. If this element flags a service performance violation, listener 190 treats this fact as a factor disfavoring directing a database connection request to the database server. The third element is a flag specifying to not direct connection requests to the database server for the service. The flag may be set in this way when the service is being quiesced, as described in Service Placement for Enforcing Performance and Availability Levels in a Multi-Node System Ser. No. 10/918,056. The fourth element is a flag indicating that no performance grade has been calculated for the service, as may be the case when a service is first started on a database instance.

Embodiments on Other Types of Multi-Node Environments

An embodiment of the present invention has been illustrated by dynamically allocating the resources of a multinode system among database services and subcategories of database services. However, the present invention is not so limited.

For example, an embodiment of the present invention may be used to allocate computer resources of a multi-node system that hosts an application server among services provided by the application server. An application server is part of, for example, a three tier architecture in which an application server sits between clients and a database server. The application server is used primarily for storing, providing access to, and executing application code, while a database server is used primarily for storing and providing access to a database for the application server. The application server transmits requests for data to the database server. The requests may be generated by an application server in response to executing the application code stored on the application server. An example of an application server is Oracle 9i Application Server or Oracle 10g Application Server. Similar to examples of a multi-node server described herein, an application server may be distributed as multiple server instances executing on multiple nodes, the server instances hosting multiple sessions that may be migrated between the server instances.

Hardware Overview

Figure 7:
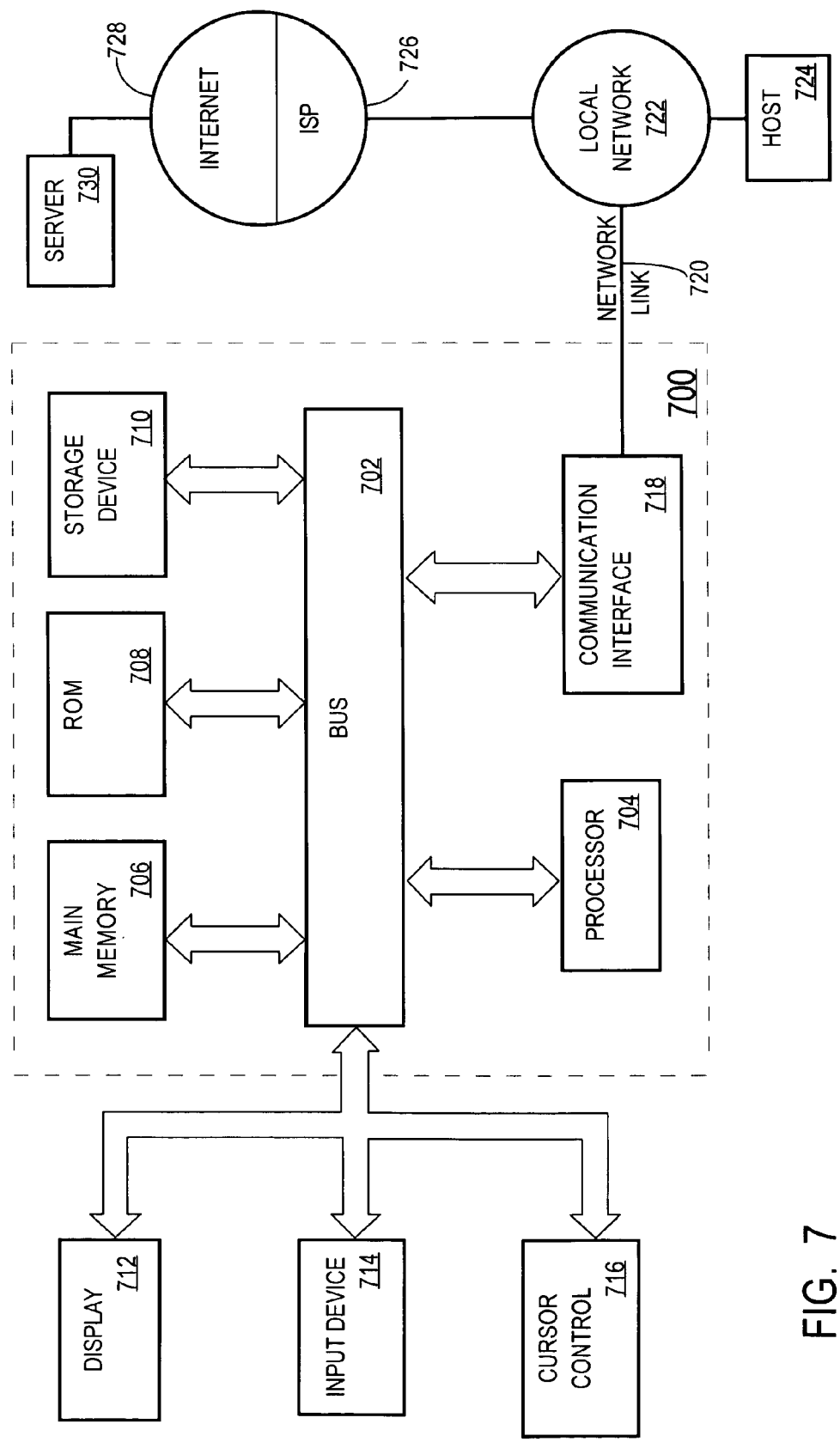
FIG. 7 is a block diagram of a computer system that may be used in an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method used for managing resources in a multi-node system, the method comprising the steps of:
   generating a plurality of performance grades that each indicate relative performance that can be realized for categories of work performed by a plurality of servers,
   wherein each server of said plurality of servers is running on a node in said multi-node system, and comprises integrated software components executed by at least one process running on said particular node,
   wherein each node in said multiple node system is a computing element interconnected to at least another node of said multiple node system, and wherein each server of said plurality of servers is associated with a performance grade of the plurality of performance grades;

wherein each performance grade of said plurality of performance grades indicates, for a particular category of work, relative performance that may be realized on a server relative to performance that may be realized on other servers of said plurality of servers; and without allocating a new server to perform a category of said categories of work, adjusting allocation of said plurality of servers between said categories of work based on said performance grades.

2. The method of claim 1, further including generating performance deltas, wherein each performance delta is associated with a certain performance grade of said plurality of performance grades and indicates a change to the certain performance grade caused by adjusting allocation of work to the server associated with the performance grade.

3. The method of claim 2, wherein the step of generating performance deltas includes generating a quotient of:
the difference between a revised performance grade for the particular category of work and a previous value for the revised performance grade, divided by
the difference of a number of sessions associated with the revised performance grade and a previous value of a number sessions for the particular category of work.

4. The method of claim 2, wherein adjusting allocation of said plurality of servers between said categories of work includes:
adjusting allocation of a first server of said plurality of servers for a first category of work;
wherein said first server is associated with a first performance grade and a first performance delta; and
in response to allocating said first server, changing the first performance grade based on the first performance delta.

5. The method of claim 4, wherein:
adjusting allocation of a first server of said plurality of servers for a first category of work includes establishing a new session on said first server; and
changing the first performance grade includes changing the first performance grade to reflect the establishment of said new session.

6. The method of claim 4, wherein:
adjusting allocation of a first server of said plurality of servers for a first category of work includes causing termination of a certain session on said first server; and
changing the first performance grade includes changing the first performance grade to reflect the termination of said certain session.

7. The method of claim 2, wherein:
the step of generating a plurality of performance grades is based on a mathematical function; and
the step of generating performance deltas is based on one or more derivatives of said mathematical function.

8. The method of claim 7, wherein a derivative of said one or more derivatives is calculated based on performance metrics generated for said categories of work.

9. The method of claim 1, wherein the step of generating a plurality of performance grades is based on one or more of the following:
a value representing a proportion of CPU usage, on a certain server of said plurality Of servers, realized for a certain category of work per each request of a subset of requests associated with said certain category of work; and
a value representing an amount of time that elapses for said each request.

10. The method of claim 9, wherein the step of generating a plurality of performance grades is based on a mathematical function X/Y, wherein:
X represents said proportion of CPU usage; and
Y represents said amount of time that elapses for said each request.

11. The method of claim 10, further including generating performance deltas, wherein:
each performance delta of said performance deltas indicates a change to a performance grade caused by allocating work to the server associated with the performance grade; and
the step of generating performance deltas is based on a derivative of said mathematical function.

12. The method of claim 1, wherein:
a first system component performs the step of generating a plurality of performance grades;
the steps further include said first system component transmitting to a second system component said plurality of performance grades; and
said second system component performs the step of adjusting allocation of said plurality or servers.

13. The method of claim 12, wherein:
the steps further include said first system component transmitting to said second system component information about a violation of one or more service-level agreements for said categories of work that occurs on said plurality of servers; and
said second system component performs the step of adjusting allocation of said plurality of servers based on said information.

14. The method of claim 12, wherein:
the steps further include said first system component transmitting to said second system component certain information about a certain category of work of said categories of work that is hosted on said plurality of servers; and
said second system component performs the step of adjusting allocation of said plurality Of servers based on said certain information about a certain category of work.

15. The method of claim 14, wherein said certain information includes information about at least one of the following:
that a particular server is no longer allocated to host the certain category of work; and
that a particular performance grade has not been generated for the certain category Of work hosted on a particular server.

16. The method of claim 1, wherein:
a first system component performs the step of generating a plurality of performance grades, wherein the step of generating a plurality of performance grades includes generating a first version of performance grades of the said plurality of performance grades and a second version of performance grades of said plurality of performance grades;
the steps further include generating a plurality of performance grades that each indicate relative performance that can be realized for categories of work performed by a plurality of servers;
the steps further include said first system component transmitting to a second system component said plurality of performance grades;
said second system component performs the step of adjusting allocation of said plurality of servers; and
the steps further include:

said second system component receiving said first version of performance grades and storing a copy of said first version of performance grades, subsequent and separate to receiving said first version of performance grades, said second system component receiving said second version of performance grades, said second system component receiving performance deltas, wherein each performance delta is associated with a certain performance grade of said first version of performance grades and indicates a change to the certain performance grade caused by allocating work to the server associated with the performance grade, and in response to adjusting allocation of said plurality of servers before receiving said second version of performance grades, said second system component adjusting said copy of said first version of performance grades based on said performance deltas.

17. A computer-readable storage medium storing instructions, the instructions including instructions which, when executed by one or more processors, cause the one or more processors to perform the steps of:

Generating a plurality of performance grades that each indicate relative performance that can be realized for categories of work performed by a plurality of servers, wherein each server of said plurality of servers is running on a node in said multi-node system and comprises integrated software components executed by at least one process running on said particular node, wherein each node in said multiple node system is a computing element interconnected to at least another node of said multiple node system, and wherein each server of said plurality of servers is associated with a performance grade of the plurality of performance grades;

wherein each performance grade of said plurality of performance grades indicates, for a particular category of work, relative performance that may be realized on a server relative to performance that may be realized on other servers of said plurality of servers; and without allocating a new server to perform a category of said categories of work, adjusting allocation of said plurality of servers between said categories of work based on said performance grades.

18. The computer-readable storage medium of claim 17 wherein the instructions further include the step of generating performance deltas, wherein each performance delta is associated with a certain performance grade of said plurality of performance grades and indicates a change to the certain performance grade caused by adjusting allocation of work to the server associated with the performance grade.

19. The computer-readable storage medium of claim 18, wherein the step of generating performance deltas includes generating a quotient of:

the difference between a revised performance grade for the particular category of work and a previous value for the revised performance grade, divided by the difference of a number of sessions associated with the revised performance grade and a previous value of a number sessions for the particular category of work.

20. The computer-readable storage medium of claim 18, wherein adjusting allocation of said plurality of servers between said categories of work includes:

adjusting allocation of a first server of said plurality of servers for a first category of work;

wherein said first server is associated with a first performance grade and a first performance delta; and in response to allocating said first server, changing the first performance grade based on the first performance delta.

21. The computer-readable storage medium of claim 20, wherein:

adjusting allocation of a first server of said plurality of servers for a first category of work includes establishing a new session on said first server; and changing the first performance grade includes changing the first performance grade to reflect the establishment of said new session.

22. The computer-readable storage medium of claim 20, wherein:

adjusting allocation of a first server of said plurality of servers for a first category of work includes causing termination of a certain session on said first server; and changing the first performance grade includes changing the first performance grade to reflect the termination of said certain session.

23. The computer-readable storage medium of claim 18, wherein:

the step of generating a plurality of performance grades is based on a mathematical function; and the step of generating performance deltas is based on one or more derivatives of said mathematical function.

24. The computer-readable storage medium of claim 23, wherein a derivative of said one or more derivatives is calculated based on performance metrics generated for said categories of work.

25. The computer-readable storage medium of claim 17, wherein the step of generating a plurality of performance grades is based on one or more of the following:

a value representing a proportion of CPU usage, on a certain server of said plurality of servers, realized for a certain category of work per each request of a subset of requests associated with said certain category of work; and a value representing an amount of time that elapses for said each request.

26. The computer-readable storage medium of claim 25, wherein the step of generating a plurality of performance grades is based on a mathematical function X/Y, wherein:

X represents said proportion of CPU usage; and

Y represents said amount of time that elapses for said each request.

27. The computer-readable storage medium of claim 26, wherein the instructions further include generating performance deltas, wherein:

each performance delta of said performance deltas indicates a change to a performance grade caused by allocating work to the server associated with the performance grade; and the step of generating performance deltas is based on a derivative of said mathematical function.

28. The computer-readable storage medium of claim 17, wherein:

a first system component performs the step of generating a plurality of performance grades;

the steps further include said first system component transmitting to a second system component said plurality of performance grades; and said second system component performs the step of adjusting allocation of said plurality of servers.

29. The computer-readable storage medium of claim 28, wherein:

the steps further include said first system component transmitting to said second system component information about a violation of one or more service-level agreements for said categories of work that occurs on said plurality of servers; and said second system component performs the step of adjusting allocation of said plurality of servers based on said information.

30. The computer-readable storage medium of claim 28, wherein:

the steps further include said first system component transmitting to said second system component certain information about a certain category of work of said categories of work that is hosted on said plurality of servers; and said second system component performs the step of adjusting allocation of said plurality of servers based on said certain information about a certain category of work.

31. The computer-readable storage medium of claim 30, wherein said certain information includes information about at least one of the following:

that a particular server is no longer allocated to host the certain category of work; and that a particular performance grade has not been generated for the certain category of work hosted on a particular server.

32. The computer-readable storage medium of claim 17, wherein:

a first system component performs the step of generating a plurality of performance grades, wherein the step of generating a plurality of performance grades includes generating a first version of performance grades of the said plurality of performance grades and a second version of performance grades of said plurality of performance grades;

the steps further include generating a plurality of performance grades that each indicate relative performance that can be realized for categories of work performed by a plurality of servers;

the steps further include said first system component transmitting to a second system component said plurality of performance grades;

said second system component performs the step of adjusting allocation of said plurality of servers; and the steps further include:

said second system component receiving said first version of performance grades and storing a copy of said first version of performance grades, subsequent and separate to receiving said first version of performance grades, said second system component receiving said second version of performance grades, said second system component receiving performance deltas, wherein each performance delta is associated with a certain performance grade of said first version of performance grades and indicates a change to the certain performance grade caused by allocating work to the server associated with the performance grade, and in response to adjusting allocation of said plurality of servers before receiving said second version of performance grades, said second system component adjusting said copy of said first version of performance grades based on said performance deltas.

* * * * *

UNITED STATES PATENT AND TRADEMARK OFFICE
CERTIFICATE OF CORRECTION

| | | |
|---|---|---|
| PATENT NO. | : 7,437,459 B2 | Page 1 of 1 |
| APPLICATION NO. | : 10/917661 | |
| DATED | : October 14, 2008 | |
| INVENTOR(S) | : Chidambaran et al. | |

It is certified that error appears in the above-identified patent and that said Letters Patent is hereby corrected as shown below:

On face page, in field (74), in column 2, under "Attorney, Agent, or Firm", line 1, delete "Hickerman" and insert -- Hickman --, therefor.

On page 2, in column 2, under "Other Publications", line 17, after "Dec." delete "12003" and insert -- 1, 2003 --, therefor.

In column 15, line 62, in claim 9, delete "Of" and insert -- of --, therefor.

In column 16, line 23, in claim 12, delete "or" and insert -- of --, therefor.

In column 16, line 40, in claim 14, delete "Of" and insert -- of --, therefor.

In column 16, line 47, in claim 15, delete "Of" and insert -- of --, therefor.

In column 17, line 23, in claim 17, delete "Generating" and insert -- generating --, therefor.

Signed and Sealed this

Thirteenth Day of April, 2010

David J. Kappos
*Director of the United States Patent and Trademark Office*